(12) United States Patent
Kimura et al.

(10) Patent No.: US 8,319,897 B2
(45) Date of Patent: Nov. 27, 2012

(54) NOISE REDUCTION METHOD, NOISE REDUCTION PROGRAM, RECORDING MEDIUM HAVING NOISE REDUCTION PROGRAM RECORDED THEREON, AND NOISE REDUCTION APPARATUS

(75) Inventors: Seiji Kimura, Chiba (JP); Masami Ogata, Kanagawa (JP); Yosuke Yamamoto, Chiba (JP); Hisafumi Motoe, Saitama (JP)

(73) Assignee: Sony Corporation, Tokyo (JP)

( * ) Notice: Subject to any disclaimer, the term of this patent is extended or adjusted under 35 U.S.C. 154(b) by 1246 days.

(21) Appl. No.: 11/769,309

(22) Filed: Jun. 27, 2007

(65) Prior Publication Data

US 2008/0002063 A1 Jan. 3, 2008

(30) Foreign Application Priority Data

Jul. 3, 2006 (JP) ................................. 2006-182946

(51) Int. Cl.
*H04N 5/00* (2006.01)
(52) U.S. Cl. ..................... 348/607; 348/701; 382/274
(58) Field of Classification Search .................. 348/607, 348/701; 382/274
See application file for complete search history.

(56) References Cited

U.S. PATENT DOCUMENTS

| | | | | |
|---|---|---|---|---|
| 4,296,436 A | * | 10/1981 | Achiha | 348/620 |
| 4,500,911 A | | 2/1985 | Ninomiya et al. | |
| 5,025,316 A | * | 6/1991 | Darby | 348/620 |
| 5,095,354 A | * | 3/1992 | Sokawa et al. | 348/452 |
| 5,185,664 A | * | 2/1993 | Darby | 348/620 |
| 5,327,241 A | * | 7/1994 | Ishizu et al. | 348/606 |
| 5,412,436 A | * | 5/1995 | Christopher | 348/700 |
| 5,574,512 A | * | 11/1996 | Saeger | 348/620 |
| 5,929,936 A | * | 7/1999 | Arai et al. | 348/607 |
| 5,969,777 A | * | 10/1999 | Mawatari | 375/240.26 |
| 6,124,900 A | * | 9/2000 | Clatanoff et al. | 348/701 |
| 6,204,890 B1 | * | 3/2001 | Kaneda | 348/607 |
| 6,414,719 B1 | * | 7/2002 | Parikh | 348/448 |
| 6,693,676 B2 | * | 2/2004 | Yamaguchi et al. | 348/452 |

(Continued)

FOREIGN PATENT DOCUMENTS

JP 02-007553 2/1990

(Continued)

OTHER PUBLICATIONS

J. M. Boyce, "Noise Reduction of Image Sequences Using Adaptive Motion Compensated Frame Averaging", Proceedings of the International Conference on Acoustics, Speech and Signal Processing, pp. 461-464 (1992).

(Continued)

*Primary Examiner* — Jefferey Harold
*Assistant Examiner* — Sam Huang
(74) *Attorney, Agent, or Firm* — Finnegan, Henderson, Farabow, Garrett & Dunner, L.L.P.

(57) ABSTRACT

A noise reduction method for reducing noise in an input video signal to output an output video signal includes the steps of generating a motion-compensated reference video signal from the output video signal; delaying the output video signal to generate a non-motion-compensated reference video signal; mixing the motion-compensated reference video signal with the non-motion-compensated reference video signal to generate a reference video signal; subtracting the generated reference video signal from the input video signal to generate a differential signal; compensating the differential signal to generate a noise reduction signal; and subtracting the noise reduction signal from the input video signal.

9 Claims, 15 Drawing Sheets

U.S. PATENT DOCUMENTS

| | | | |
|---|---|---|---|
| 7,098,963 B2 * | 8/2006 | Yu | 348/620 |
| 7,542,095 B2 * | 6/2009 | Zhou et al. | 348/452 |
| 7,751,619 B2 * | 7/2010 | Kawanishi et al. | 382/167 |
| 2001/0012325 A1 * | 8/2001 | Kobayashi et al. | 375/240.26 |
| 2004/0196407 A1 * | 10/2004 | Gengintani et al. | 348/604 |
| 2005/0243911 A1 * | 11/2005 | Kwon et al. | 375/240.03 |
| 2005/0243912 A1 * | 11/2005 | Kwon et al. | 375/240.03 |
| 2005/0243913 A1 * | 11/2005 | Kwon et al. | 375/240.03 |
| 2005/0243914 A1 * | 11/2005 | Kwon et al. | 375/240.03 |
| 2005/0243915 A1 * | 11/2005 | Kwon et al. | 375/240.03 |
| 2005/0243916 A1 * | 11/2005 | Kwon et al. | 375/240.03 |
| 2005/0244063 A1 * | 11/2005 | Kwon et al. | 382/233 |
| 2005/0265627 A1 * | 12/2005 | Yamauchi | 382/275 |
| 2006/0056724 A1 * | 3/2006 | Le Dinh et al. | 382/274 |
| 2009/0141149 A1 * | 6/2009 | Zhang et al. | 348/241 |

FOREIGN PATENT DOCUMENTS

| | | |
|---|---|---|
| JP | 2000-013643 | 1/2000 |
| JP | 2001-042831 | 2/2001 |
| JP | 2001-136416 | 5/2001 |
| JP | 2004-088234 | 3/2004 |
| WO | WO 2004/039074 A1 | 5/2004 |

OTHER PUBLICATIONS

European Search Report in EP 07 25 2658 dated Nov. 27, 2009.
Notification of Reasons for Refusal dated May 10, 2011, from the Japanese Patent Office in corresponding Japanese Patent Application No. 2006-182946.

* cited by examiner

PRIOR ART

NOISE REDUCTION METHOD, NOISE REDUCTION PROGRAM, RECORDING MEDIUM HAVING NOISE REDUCTION PROGRAM RECORDED THEREON, AND NOISE REDUCTION APPARATUS

CROSS REFERENCES TO RELATED APPLICATIONS

The present invention contains subject matter related to Japanese Patent Application JP 2006-182946 filed in the Japanese Patent Office on Jul. 3, 2006, the entire contents of which are incorporated herein by reference.

BACKGROUND OF THE INVENTION

1. Field of the Invention

The present invention relates to a noise reduction method, a noise reduction program, a recording medium having the noise reduction program recorded thereon, and a noise reduction apparatus. More particularly, the present invention is applicable to a recursive noise filter for reduction of any noise in a video signal. The present invention relates to mixing of a motion-compensated reference video signal with a non-motion-compensated reference video signal to generate a reference video signal and use of the reference video signal to generate a differential signal in order to sufficiently reduce even a higher noise level.

2. Description of the Related Art

A typical recursive noise filter in related art uses a difference in time between fields or between frames to reduce any noise in a video signal, as shown in FIG. 16. A noise filter 1 shown in FIG. 16 is a motion adaptive noise filter. In the noise filter 1, a delay signal generating unit 2 delays an output video signal S2 for a time corresponding to one field or one frame to supply a reference video signal S3 for extraction of noise components to a subtractor circuit 3. The subtractor circuit 3 subtracts the reference video signal S3 from an input video signal S1 to generate a differential signal S4. A noise extracting unit 4 sets a feedback ratio to a higher value, for example, if the differential signal S4 has a lower amplitude (is likely to be a noise) and sets the feedback ratio to a lower value if the differential signal S4 has a higher amplitude (is not likely to be a noise).

Specifically, the noise extracting unit 4 performs nonlinear processing to the differential signal S4 with, for example, an input-output characteristic shown in FIG. 17 to generate a noise reduction signal S5. A subtractor circuit 5 subtracts the noise reduction signal S5 from the input video signal S1 to generate the output video signal S2.

In contrast, a noise filter 11 shown in FIG. 18 is a motion compensation noise filter. The same reference numerals are used in the noise filter 11 to identify the same components in the noise filter 1 shown in FIG. 16. A description of such components is omitted herein. In the noise filter 11, a motion vector detecting unit 12 detects a motion vector MV from the reference video signal S3 on the basis of the input video signal S1. A motion compensating unit 13 performs motion compensation to the reference video signal S3 with the motion vector MV detected by the motion vector detecting unit 12 to generate a motion-compensated reference video signal S6. The noise filter 11 subtracts the motion-compensated reference video signal S6 from the input video signal S1 to generate the differential signal S4.

For example, Japanese Unexamined Patent Application Publication No. 2001-136416 discloses a method of measuring a noise level and automatically setting a signal level of the noise reduction signal S5 on the basis of the measurement result in such a recursive noise filter.

Generally, it is possible for the motion compensation noise filter to sufficiently reduce the noise level even in motion pictures. However, the motion compensation noise filter can erroneously detect a motion vector when the noise level increases. In this case, it becomes difficult for the motion compensation noise filter to correctly perform the motion compensation to the reference video signal S3, thus preventing the noise from being sufficiently reduced. In addition, the noise reduction level can locally vary in a spatial direction and in a time direction particularly in flat areas. As a result, the noise shows undulation on a screen to cause a user to feel discomfort.

If the noise level increases, the size and direction of the motion vector vary in the spatial and time directions in the flat areas and the spatial and time variations depend on an algorithm of detecting the motion vector. As a result, the motion-compensated reference video signal has any correlation with the input reference signal in terms of the noise and the noise shows the undulation on the screen.

SUMMARY OF THE INVENTION

It is desirable to provide a noise reduction method, a noise reduction program, a recording medium having the noise reduction program recorded thereon, and a noise reduction apparatus, which are capable of sufficiently reducing even a higher noise level.

According to an embodiment of the present invention, a noise reduction method for reducing noise in an input video signal to output an output video signal includes the steps of generating a motion-compensated reference video signal from the output video signal; delaying the output video signal to generate a non-motion-compensated reference video signal; mixing the motion-compensated reference video signal with the non-motion-compensated reference video signal to generate a reference video signal; subtracting the generated reference video signal from the input video signal to generate a differential signal; compensating the differential signal to generate a noise reduction signal; and subtracting the noise reduction signal from the input video signal.

According to another embodiment of the present invention, a noise reduction program for reducing noise in an input video signal to output an output video signal includes the steps of generating a motion-compensated reference video signal from the output video signal; delaying the output video signal to generate a non-motion-compensated reference video signal; mixing the motion-compensated reference video signal with the non-motion-compensated reference video signal to generate a reference video signal; subtracting the generated reference video signal from the input video signal to generate a differential signal; compensating the differential signal to generate a noise reduction signal; and subtracting the noise reduction signal from the input video signal.

According to another embodiment of the present invention, there is provided a recording medium having a noise reduction program recorded thereon for reducing noise in an input video signal to output an output video signal. The program includes the steps of generating a motion-compensated reference video signal from the output video signal; delaying the output video signal to generate a non-motion-compensated reference video signal; mixing the motion-compensated reference video signal with the non-motion-compensated reference video signal to generate a reference video signal; subtracting the generated reference video signal from the input video signal to generate a differential signal; compensating the differential signal to generate a noise reduction signal; and subtracting the noise reduction signal from the input video signal.

According to another embodiment of the present invention, a noise reduction apparatus for reducing noise in an input video signal to output an output video signal includes a motion compensation unit that generates a motion-compensated reference video signal from the output video signal; a delay unit that delays the output video signal to generate a non-motion-compensated reference video signal; a reference video signal generating unit that mixes the motion-compensated reference video signal with the non-motion-compensated reference video signal to generate a reference video signal; a differential signal generating unit that subtracts the generated reference video signal from the input video signal to generate a differential signal; a noise reduction signal generating unit that compensates the differential signal to generate a noise reduction signal; and a signal subtraction unit that subtracts the noise reduction signal from the input video signal.

According to the embodiments of the present invention, the configuration can be switched between the motion adaptive noise filter and the motion compensation noise filter depending on the setting of the mixing ratio between the motion-compensated reference video signal and the non-motion-compensated reference video signal in the generation of the reference video signal. In addition, the configuration may be switched to combination of the motion adaptive noise filter with the motion compensation noise filter. Consequently, the noise in motion pictures and still images is sufficiently reduced in the configuration of the motion compensation noise filter and, if the motion compensation is not correctly performed, the configuration is switched to the motion adaptive noise filter by varying the setting of the mixing ratio to reduce the noise. As a result, it is possible to sufficiently reduce even a higher noise level.

DESCRIPTION OF THE PREFERRED EMBODIMENTS

Embodiments of the present invention will herein be described with reference to the attached drawing.

First Embodiment

Configuration

Figure 2:
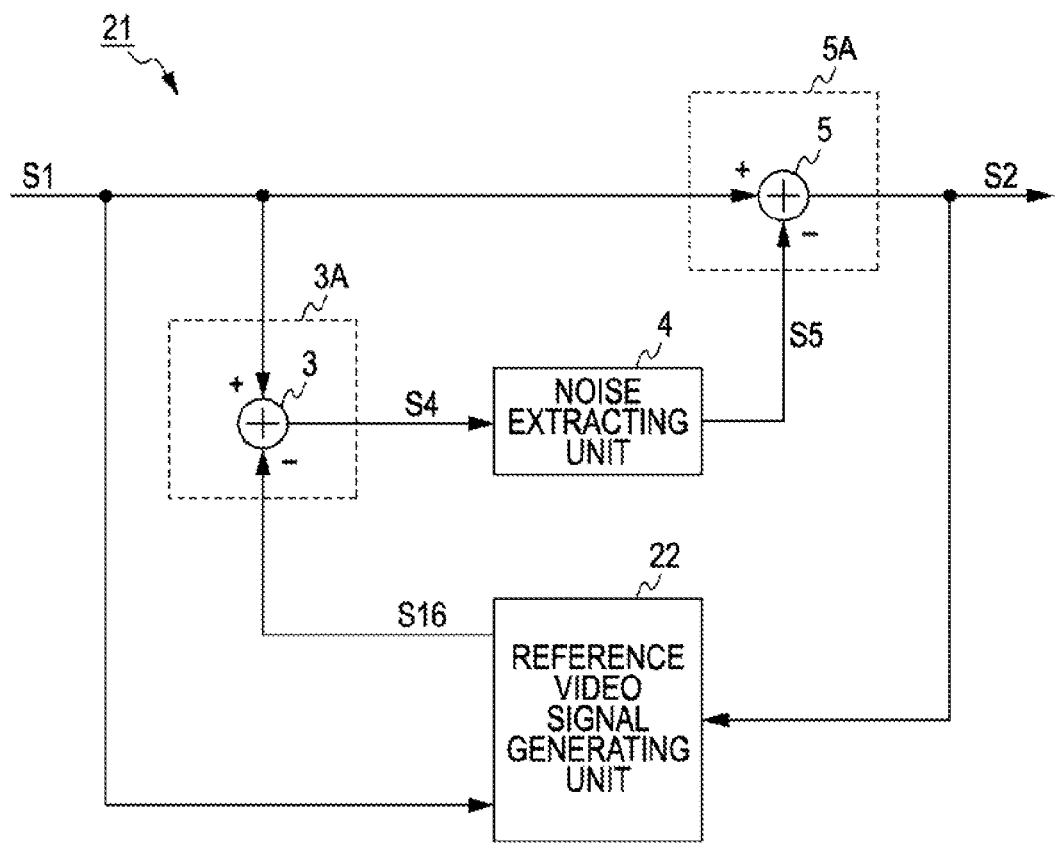
FIG. 2 is a block diagram showing an example of the configuration of the noise filter according to the first embodiment of the present invention.
Figure 16:
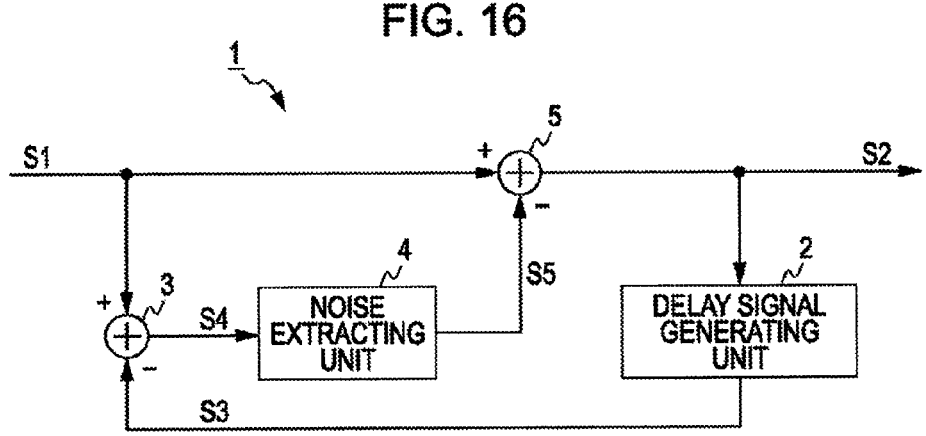
FIG. 16 is a block diagram showing the configuration of a motion adaptive noise filter of a recursive type in related art.
Figure 18:
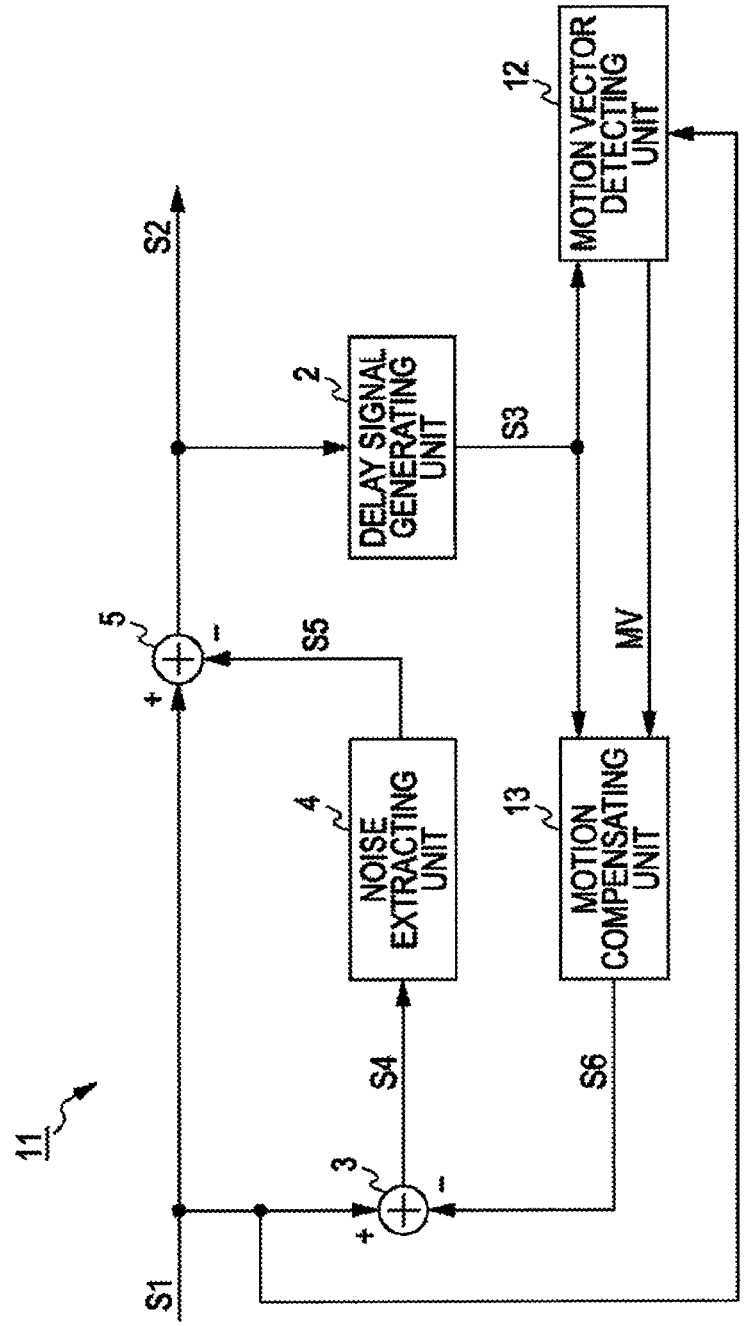
FIG. 18 is a block diagram showing the configuration of a motion compensation noise filter of the recursive type in the related art.

FIG. 2 is a block diagram showing an example of the configuration of a noise filter 21 according to a first embodiment of the present invention. The noise filter 21 is a recursive noise filter. In the noise filter 21, a reference video signal generating unit 22 generates a reference video signal S16. A subtractor circuit 3 generates a differential signal S4 between the reference video signal S16 and an input video signal S1. The same reference numerals are used in the noise filter 21 in FIG. 2 to identify the same components in the noise filter 1 in FIG. 16 and the noise filter 11 in FIG. 18. A description of such components is omitted herein. The subtractor circuit 3 forms a differential signal generating unit 3A generating the differential signal S4 between the input video signal S1 and the motion-compensated reference video signal S16. A subtractor circuit 5 forms a noise subtraction processing unit 5A subtracting a noise reduction signal S5 from the input video signal S1 to reduce any noise from the input video signal S1.

Figure 1:
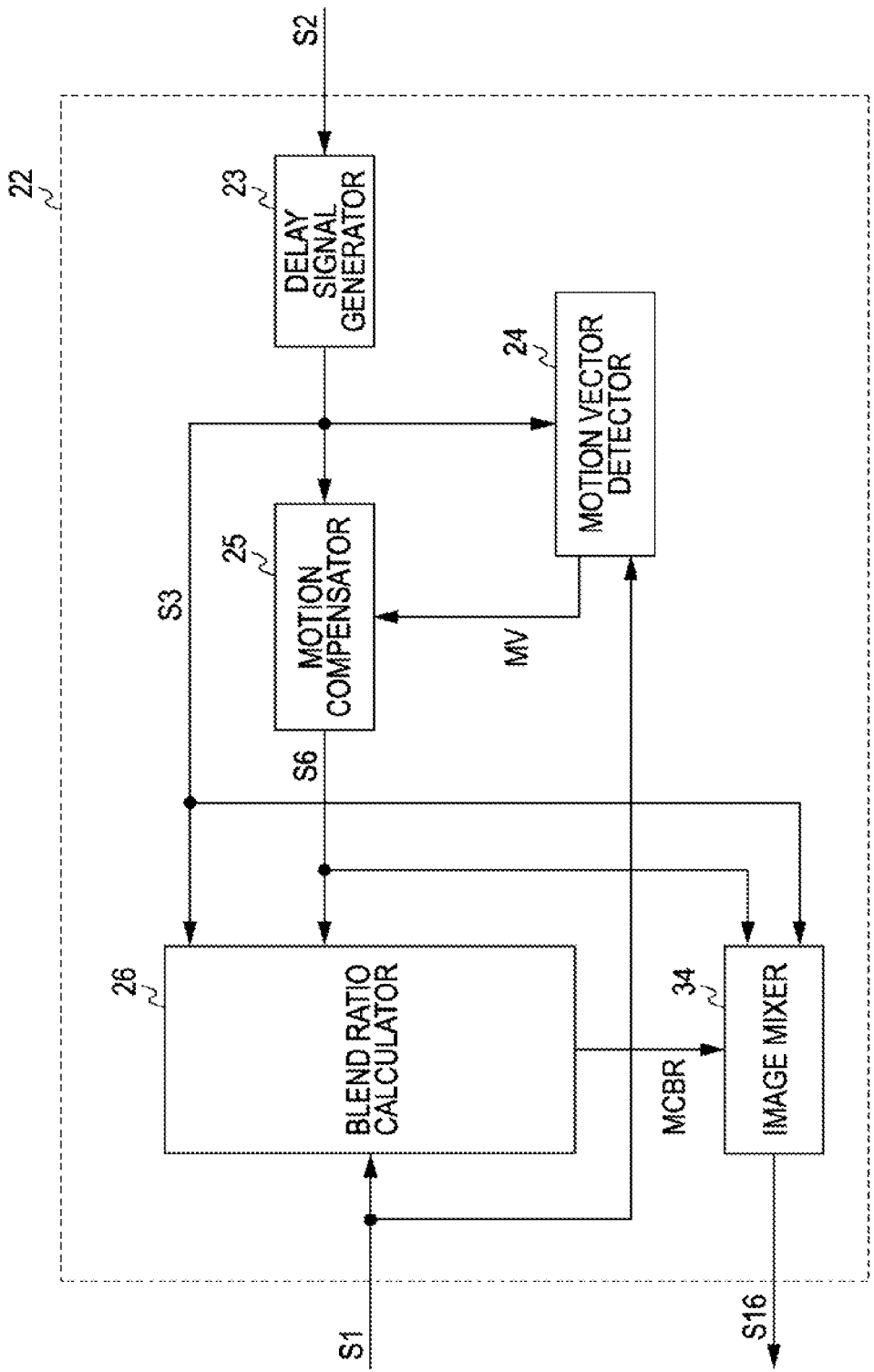
FIG. 1 is a block diagram showing an example of the configuration of a reference video signal generating unit in a noise filter according to a first embodiment of the present invention.

FIG. 1 is a block diagram showing an example of the configuration of the reference video signal generating unit 22 shown in FIG. 2 in detail. In the reference video signal generating unit 22, a delay signal generator 23 delays an output video signal S2 for a time corresponding to one field or one frame to output a non-motion-compensated reference video signal S3.

A motion vector detector 24 detects a motion vector MV from the reference video signal S3 output from the delay signal generator 23 on the basis of the input video signal S1. The motion vector MV can be detected by various methods including block matching and a gradient method. The detection accuracy of the motion vector MV may be integer pixel accuracy or decimal pixel accuracy. A motion compensator 25 performs motion compensation to the reference video signal S3 with the motion vector MV detected by the motion vector detector 24 to generate a motion-compensated reference video signal S6.

A blend ratio calculator 26 analyzes the non-motion-compensated reference video signal S3 and the motion-compensated reference video signal S6 on the basis of the input video signal S1 and mixes the non-motion-compensated reference video signal S3 with the motion-compensated reference video signal S6 on the basis of the analysis result to calculate a blend ratio MCBR, which is a mixing ratio used when the reference video signal S6 is generated.

Figure 3:
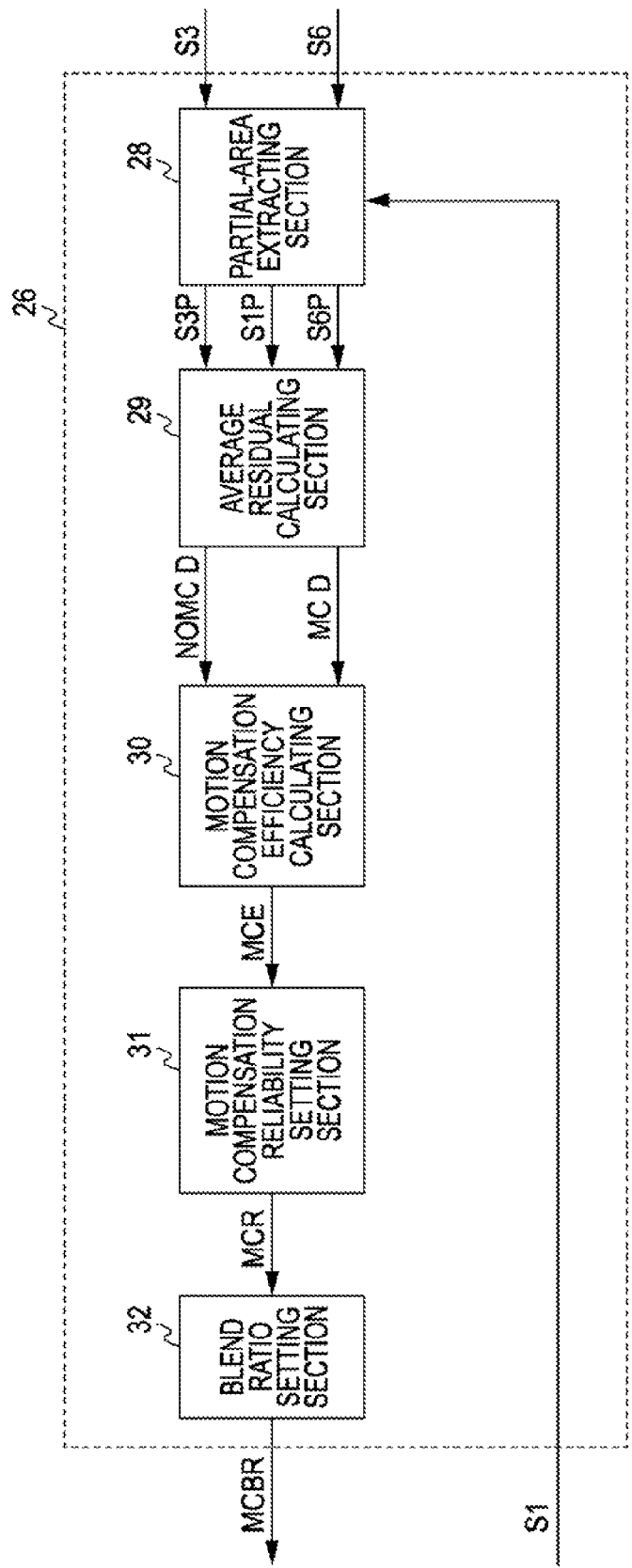
FIG. 3 is a block diagram showing an example of the configuration of a blend ratio calculator in the reference video signal generating unit in FIG. 1.
Figure 4:
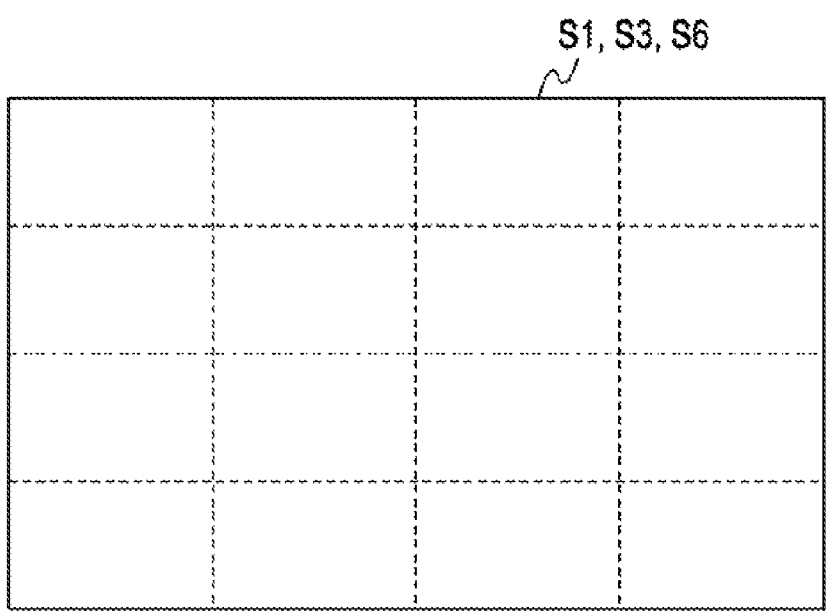
FIG. 4 illustrates how to set areas.
Figure 5:
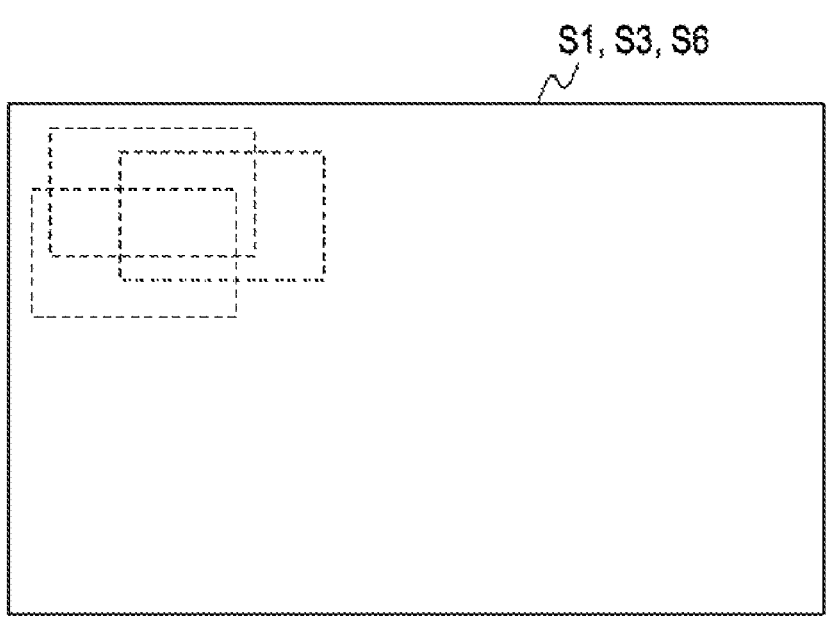
FIG. 5 illustrates another method in which the areas are set.

FIG. 3 is a block diagram showing an example of the configuration of the blend ratio calculator 26 in detail. In the blend ratio calculator 26, the non-motion-compensated reference video signal S3, the motion-compensated reference video signal S6, and the input video signal S1 are supplied to a partial-area extracting section 28. The partial-area extracting section 28 horizontally and vertically divides one screen of the input video signal S1 into multiple areas, as shown in FIG. 4. The partial-area extracting section 28 allocates the input video signal S1 and the reference video signals S3 and S6 to each area and outputs the input video signal S1 and the reference video signals S3 and S6 from each area. The input video signal S1 and the reference video signals S3 and S6, which are allocated to the areas and are output from the areas, are referred to as a partial video signal S1P and partial reference video signals S3P and S6P, respectively. As shown in FIG. 5 in contrast to FIG. 4, the areas may be set such that the adjacent areas are partially overlapped with each other.

An average residual calculating section 29 calculates a residual of the non-motion-compensated reference video signal S3 with respect to the input video signal S1 for every area set by the partial-area extracting section 28. According to the first embodiment of the present invention, the residuals of pixels are averaged for every area to calculate an average residual NOMC D. The average residual calculating section 29 also calculates a residual of the motion-compensated reference video signal S6 with respect to the input video signal S1 for every area set by the partial-area extracting section 28. According to the first embodiment of the present invention, in the calculation of the residual of the motion-compensated reference video signal S6, the residuals of pixels are averaged for every area to calculate an average residual MC D, as in the non-motion-compensated reference video signal S3. Various calculation methods, such as mean square error, root mean square error, and mean absolute error, are applicable to the calculation of the average residual. The average residual NOMC D of the non-motion-compensated reference video signal S3 with respect to the input video signal S1 is hereinafter referred to as a simple average residual. The average residual MC D of the motion-compensated reference video signal S6 with respect to the input video signal S1 is hereinafter referred to as a motion compensation average residual.

The simple average residual NOMC D indicates the residual with respect to the input video signal S1 when the motion compensation is not performed and the motion compensation average residual MC D indicates the residual with respect to the input video signal S1 when the motion compensation is performed. The simple average residual NOMC D has a smaller value in a still image and the motion compensation average residual MC D has a smaller value when the motion compensation is correctly performed in a motion picture. Accordingly, the simple average residual NOMC D indicates how well the non-motion-compensated reference video signal S3 is adapted to generation of the differential signal S4, and the motion compensation average residual MC D indicates how well the motion-compensated reference video signal S6 is adapted to the generation of the differential signal S4.

A motion compensation efficiency calculating section 30 integrates the simple average residual NOMC D with the motion compensation average residual MC D to calculate an evaluation value indicating which of the non-motion-compensated reference video signal S3 and the motion-compensated reference video signal S6 is better adapted to the generation of the differential signal S4. The motion compensation efficiency calculating section 30 performs the integration of the simple average residual NOMC D with the motion compensation average residual MC D with respect to the motion compensation average residual MC D. As a result, the motion compensation efficiency calculating section 30 calculates a motion compensation efficiency MCE indicating how well the motion-compensated reference video signal S6 is adapted to the generation of the differential signal S4 in contrast to the non-motion-compensated reference video signal S3, as the evaluation value indicating which of the non-motion-compensated reference video signal S3 and the motion-compensated reference video signal S6 is better adapted to the generation of the differential signal S4.

In other words, the motion compensation efficiency calculating section 30 performs the calculation (NOMC D−MC D)/MC D for every area to calculate the motion compensation efficiency MCE. On the contrary, the motion compensation efficiency calculating section 30 may perform the integration of the simple average residual NOMC D with the motion compensation average residual MC D with respect to the simple average residual NOMC D to calculate an efficiency indicating how well the non-motion-compensated reference video signal S3 is adapted to the generation of the differential signal S4 as a parameter indicating which of the non-motion-compensated reference video signal S3 and the motion-compensated reference video signal S6 is better adapted to the generation of the differential signal S4. In this case, the arithmetic expression (MC D−NOMC D)/NOMC D is used and a setting in a motion compensation reliability setting unit 31 described below will be varied in accordance with the used arithmetic expression.

The motion compensation efficiency calculating section 30 sets the motion compensation efficiency MCE to zero and outputs the motion compensation efficiency MCE being set to zero if the motion compensation efficiency MCE has a negative value or if the simple average residual NOMC D is equal to zero. The calculation of the motion compensation efficiency MCE may be performed by the arithmetic processing or may be performed by using a lookup table.

Figure 6:
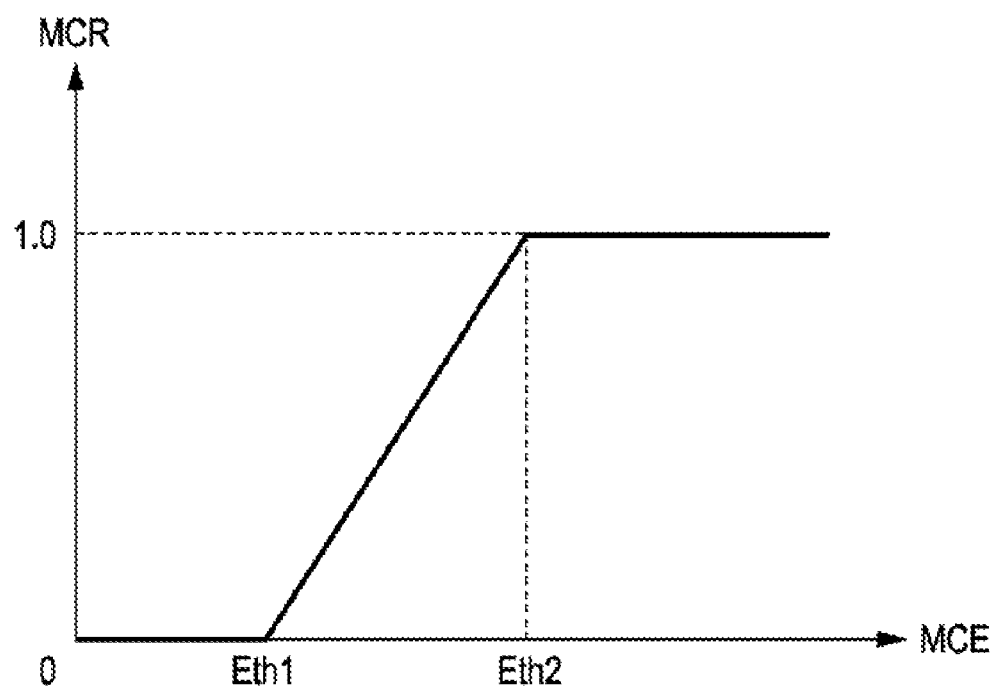
FIG. 6 is a graph showing an example of a characteristic curve to describe the operation of a motion compensation reliability setting unit in the blend ratio calculator in FIG. 3.

The motion compensation reliability setting unit 31 calculates an intermediate value MCR of the blend ratio in accordance with the motion compensation efficiency MCE. As shown in FIG. 6, the motion compensation reliability setting unit 31 clips a lower value of the motion compensation efficiency MCE to zero with a first threshold Eth1 and clips a higher value thereof to one with a second threshold Eth2 to compensate the value of the motion compensation efficiency MCE. The motion compensation reliability setting unit 31 outputs the compensated motion compensation efficiency MCE as the intermediate value MCR of the blend ratio. The intermediate value MCR indicates the reliability of the motion compensation in the motion-compensated reference video signal S6 in contrast to the non-motion-compensated reference video signal S3. Accordingly, the intermediate value MCR is hereinafter appropriately referred to as the reliability.

A blend ratio setting section 32 calculates the final blend ratio MCBR from the reliability MCR. According to the first embodiment of the present invention, the blend ratio setting section 32 outputs the reliability MCR as the blend ratio MCBR.

Referring back to FIG. 1, an image mixer 34 performs weighted addition to the non-motion-compensated reference video signal S3 and the motion-compensated reference video signal S6 with the blend ratio MCBR and mixes the non-motion-compensated reference video signal S3 with the motion-compensated reference video signal S6 to output the reference video signal S16. Specifically, the image mixer 34 performs arithmetic processing S16=MCBR×S6+(1−MCBR)×S3 to mix the non-motion-compensated reference video signal S3 with the motion-compensated reference video signal S6 in order to output the reference video signal S16.

The series of processing in the blend ratio calculator 26 may be performed by decimating the reference video signals S3 and S6. In this case, the image mixer 34 calculates the blend ratio for the motion compensation of each pixel by, for example, zero-order-hold or linear interpolation, and performs image mixing. As described above with reference to FIG. 5, when the areas are set such that the adjacent areas are partially overlapped with each other, the blend ratios calculated in the overlapping areas may be averaged to mix the reference video signal S3 with the reference video signal S6 by the averaged blend ratio. The blend ratios detected in the two overlapping areas may be gradually varied and switched by the linear interpolation. Alternatively, the blend ratio of each area may be smoothed and the smoothed blend ratio may be used in the weighting of the reference video signals S3 and S6 to smoothly switch the blend ratio in the boundary between areas. The blend ratio may be calculated for every pixel instead of the calculation of the blend ratio for every area. In this case, the average residual calculating section 29 calculates the residual within a predetermined range around a target pixel and sequentially processes the residuals calculated for every target pixel to calculate the blend ratio for every pixel. It is also necessary in this case to smooth the calculated blend ratio and to use the smoothed blend ratio in the weighting of the reference video signals S3 and S6.

Figure 7:
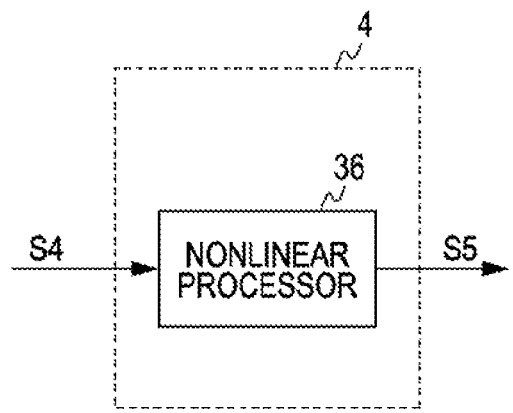
FIG. 7 is a block diagram showing an example of the configuration of a noise extracting unit in the noise filter in FIG. 2.
Figure 8:
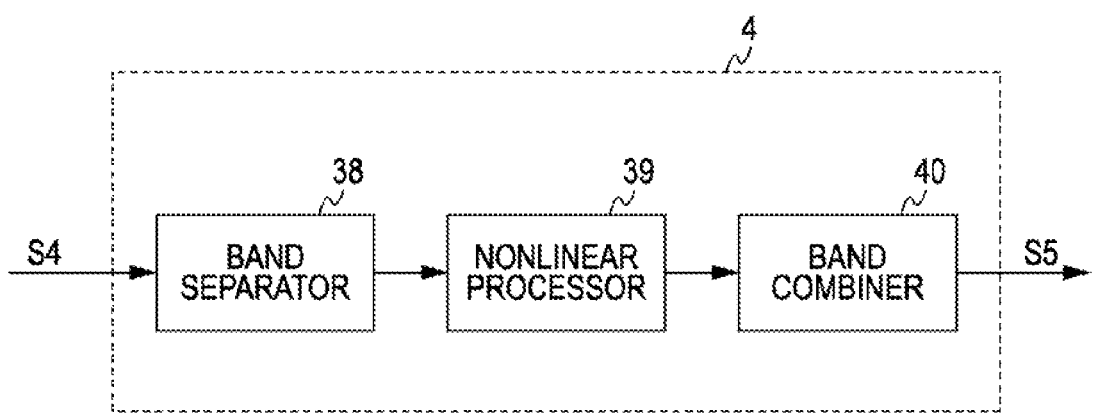
FIG. 8 is a block diagram showing another example of the configuration of the noise extracting unit in the noise filter in FIG. 2.
Figure 17:
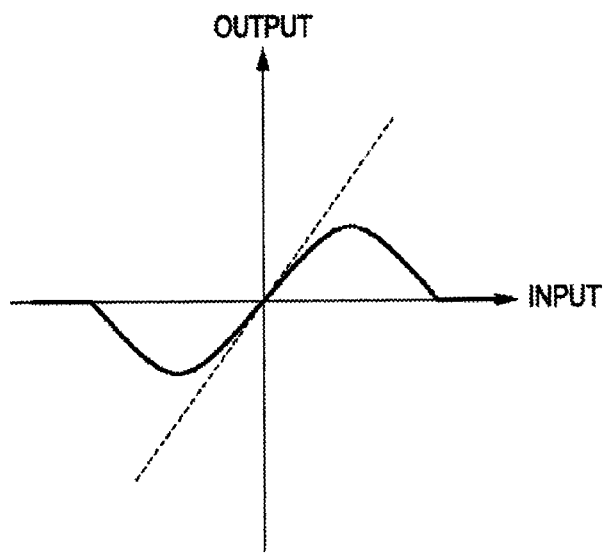
FIG. 17 is a graph showing a characteristic curve of a noise extracting unit in the noise filter shown in FIG. 16.

In the noise extracting unit 4 shown in FIG. 2 according to the first embodiment of the present invention, as shown in FIG. 7, a nonlinear processor 36 compensates the differential signal S4 with the nonlinear input-output characteristic shown in FIG. 17 to generate the noise reduction signal S5. In the noise extracting unit 4, as shown in FIG. 8, a band separator 38 may separate the differential signal S4 into multiple bands, a nonlinear processor 39 may perform nonlinear processing for every band, and a band combiner 40 may combine the band-separated signals into one signal to generate the noise reduction signal S5, instead of the configuration shown in FIG. 7. In this case, various band separation methods including orthogonal transformation such as Hadamard, Haar, and DCT, wavelet-transformation using a filter bank, and sub-band separation are applicable to the band separation in the band separator 38.

Operation

In the noise filter 21 having the above configuration according to the first embodiment of the present invention, as shown in FIG. 2, the subtractor circuit 5 subtracts the noise reduction signal S5 from each of the input video signals S1, which are sequentially input, to reduce noise components and outputs the output video signal S2. The reference video signal generating unit 22 processes the output video signal S2 to generate the reference video signal S16. The subtractor circuit 3 subtracts the reference video signal S16 from the input video signal S1 to generate the differential signal S4. The noise extracting unit 4 performs the nonlinear processing to the differential signal S4 to generate the noise reduction signal S5.

As described above, in the noise filter 21 according to the first embodiment of the present invention, which is a recursive noise filter, it is difficult to sufficiently reduce the noise in motion pictures although the noise can be sufficiently reduced in still images when the reference video signal S16 is generated without the motion compensation. In contrast, when the reference video signal S16 is generated with the motion compensation being performed, it is possible to sufficiently reduce the noise in motion pictures. However, the motion vector can be erroneously detected to prevent correct motion compensation if the noise level increases and, thus, it is not possible to sufficiently reduce the noise. In flat areas, the noise shows undulation to cause a user to feel greater discomfort.

Accordingly, in the noise filter 21, the non-motion-compensated reference video signal S3 and the motion-compensated reference video signal S6 are generated using the input video signal S1, and the non-motion-compensated reference video signal S3 is mixed with the motion-compensated reference video signal S6 to generate the reference video signal S16. The generated reference video signal S16 is used to generate the differential signal S4 from which the noise reduction signal S5 is generated.

The configuration of the noise filter 21 can be switched between the motion adaptive noise filter and the motion compensation noise filter depending on the setting of the mixing ratio between the motion-compensated reference video signal and the non-motion-compensated reference video signal in the generation of the reference video signal. In addition, the configuration may be switched to combination of the motion adaptive noise filter with the motion compensation noise filter. Consequently, the noise in motion pictures and still images is sufficiently reduced in the configuration of the motion compensation noise filter and, if the motion compensation is not correctly performed, the configuration is switched to the motion adaptive noise filter by varying the setting of the mixing ratio to reduce the noise. As a result, it is possible to sufficiently reduce even a higher noise level.

In the noise filter 21, the blend ratio calculator 26 calculates the mixing ratio MCBR between the motion-compensated reference video signal S6 and the non-motion-compensated reference video signal S3 by comparing the input video signal S1 and the reference video signals S3 and S6.

Specifically, the average residual calculating section 29 in FIG. 3 calculates the residual of the non-motion-compensated reference video signal S3 with respect to the input video signal S1 as the simple average residual NOMC D and calculates the residual of the motion-compensated reference video signal S6 with respect to the input video signal S1 as the motion compensation average residual MC D.

The noise filter 21 sets the mixing ratio MCBR in accordance with the simple average residual NOMC D and the motion compensation average residual MC D, and the motion-compensated reference video signal S6 is mixed with the non-motion-compensated reference video signal S3 by the blend ratio MCBR to generate the reference video signal S16. Accordingly, in the noise filter 21, it is possible to generate the reference video signal S16 by increasing the percentage in the reference video signal S16 of the reference video signal S3 or S6, which is better adapted to the generation of the differential signal S4, so that the noise level can be sufficiently reduced in the still images and the motion pictures and the noise level can also be sufficiently reduced even if the motion vector is erroneously detected.

If practically sufficient characteristics can be ensured, only the simple average residual NOMC D may be used to set the mixing ratio MCBR, instead of setting the mixing ratio MCBR in accordance with the simple average residual NOMC D and the motion compensation average residual MC D. Alternatively, only the motion compensation average residual MC D may be used to set the mixing ratio MCBR.

Specifically, in the noise filter 21 according to the first embodiment of the present invention, the motion compensation efficiency calculating section 30 integrates the simple average residual NOMC D with the motion compensation average residual MC D with respect to the motion compensation average residual MC D to calculate an evaluation value, the motion compensation efficiency MCE, and the blend ratio MCBR is calculated on the basis of the evaluation value MCE. Accordingly, even if both the simple average residual NOMC D and the motion compensation average residual MC D have higher values, it is possible to mix the reference video signal S6 with the reference video signal S3 so as to be best adapted to the generation of the differential signal S4 to generate the reference video signal S16, thus efficiently reducing the noise level.

A higher value of the evaluation value MCE is clipped to one and a lower value thereof is clipped to zero. Accordingly, when the blend ratio MCBR is set so that only the non-motion-compensated reference video signal S3 is used to generate the differential signal S4 and when the blend ratio MCBR is set so that only the motion-compensated reference video signal S6 is used to generate the differential signal S4, the operation is set so as to be continued even if the simple average residual NOMC D and the motion compensation average residual MC D are varied to some extent. Consequently, the noise filter 21 can appropriately set the mixing ratio between the non-motion-compensated reference video signal S3 and the motion-compensated reference video signal S6 to reduce the noise level.

Since the calculation of the blend ratio is performed for every area set for the input video signal S1, it is possible to appropriately reduce the noise level even if both still images and motion pictures exist.

According to the first embodiment of the present invention, the motion-compensated reference video signal is mixed with the non-motion-compensated reference video signal to generate the reference video signal and the generated reference video signal is used to generate the differential signal, so that even a higher noise level can be sufficiently reduced.

The residuals of the motion-compensated reference video signal and the non-motion-compensated reference video signal with respect to the input video signal are calculated, and the blend ratio is set in accordance with the residuals to mix the motion-compensated reference video signal with the non-motion-compensated reference video signal by the calculated blend ratio. Accordingly, the noise level can be sufficiently reduced in the still images and the motion pictures and the noise level can also be sufficiently reduced even if the motion vector is erroneously detected.

Specifically, the residual of the motion-compensated reference video signal is integrated with the residual of the non-motion-compensated reference video signal to calculate one evaluation value, and the blend ratio is set in accordance with the calculated evaluation value. Accordingly, it is possible to appropriately set the blend ratio to sufficiently reduce the noise level even if both of the residuals have higher values.

Even if both still images and motion pictures exist, setting the blend ratio for every area allows the blend ratio to be appropriately set for each picture to sufficiently reduce the noise level.

Second Embodiment

Figure 9:
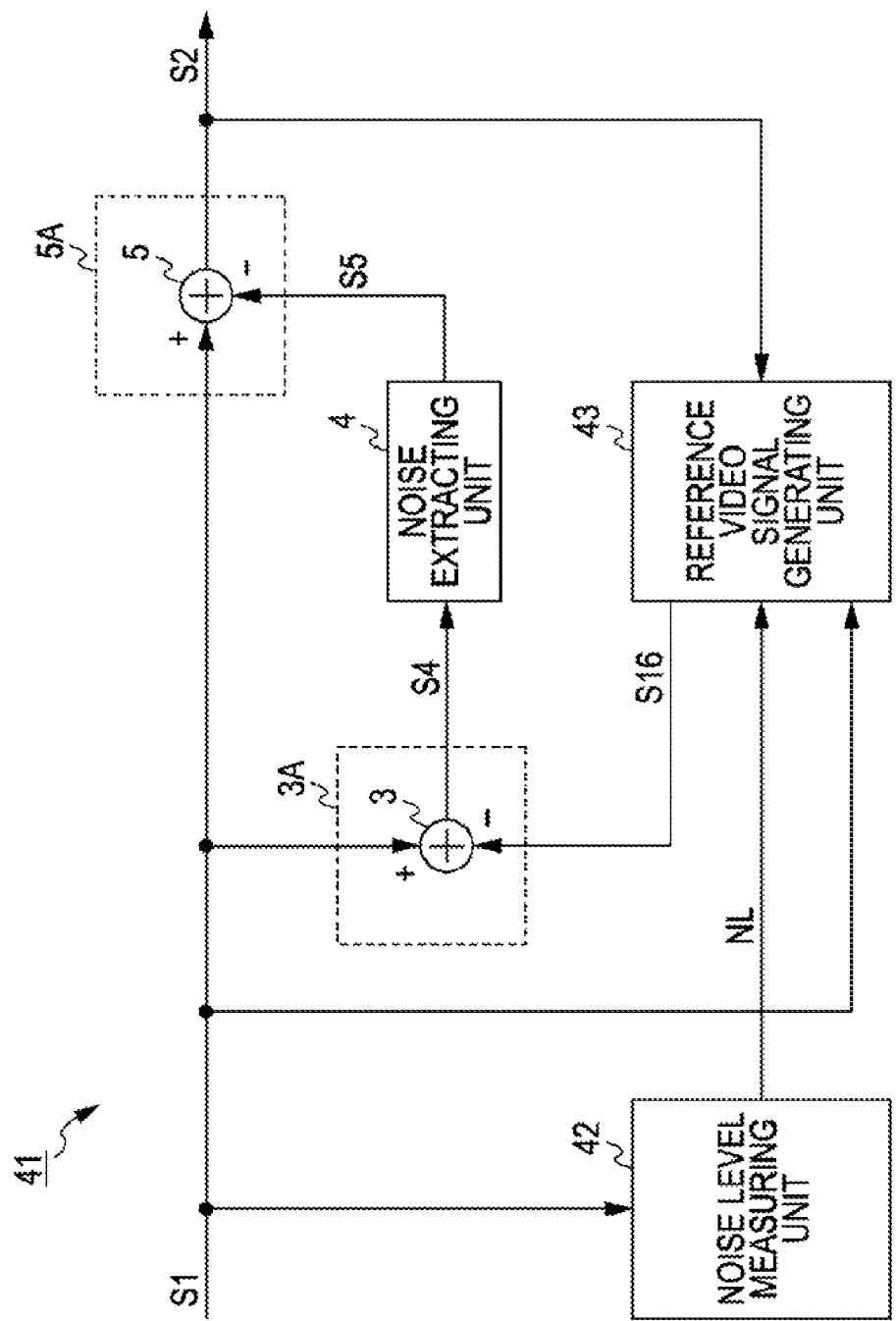
FIG. 9 is a block diagram showing an example of the configuration of a noise filter according to a second embodiment of the present invention.

FIG. 9 is a block diagram showing an example of the configuration of a noise filter 41 according to a second embodiment of the present invention. The same reference numerals are used in the noise filter 41 to identify the same components in the noise filter 21 according to the first embodiment. A description of such components is omitted herein. In the noise filter 41, a noise level measuring unit 42 measures a noise level of the input video signal S1, and a reference video signal generating unit 43 generates the reference video signal S16 on the basis of a noise-level measurement result NL.

The noise level measuring unit 42 outputs the noise-level measurement result NL for every pixel, for every area allocated to the reference video signals S3 and S6, or for every frame or field. Various methods including detection of the signal level in a higher bandwidth are applicable to the measurement of the noise level.

Figure 10:
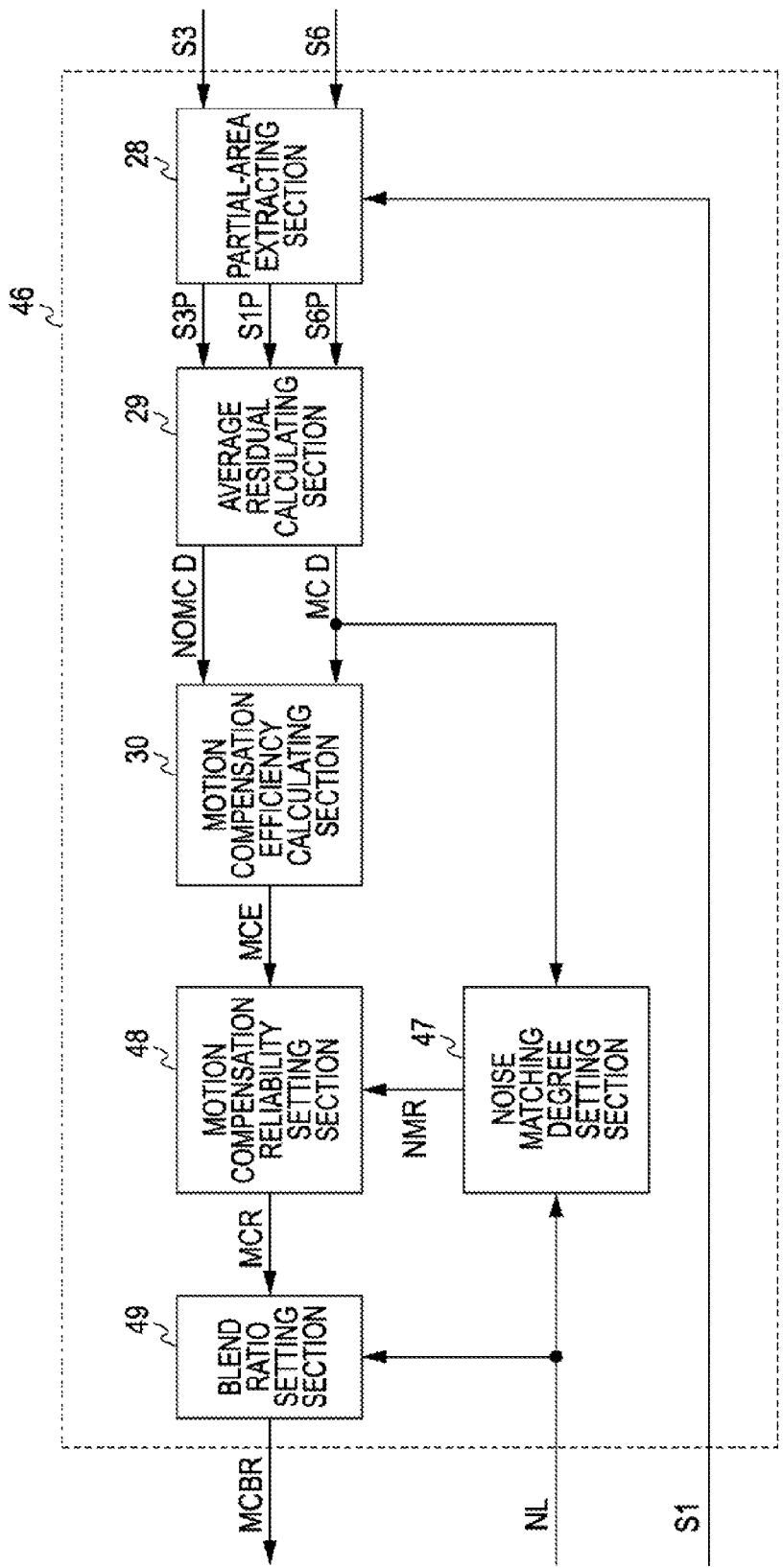
FIG. 10 is a block diagram showing an example of a blend ratio calculator in the noise filter shown in FIG. 9.

The reference video signal generating unit 43 is configured in the same manner as the reference video signal generating unit 22 according to the first embodiment except that the reference video signal generating unit 43 includes a blend ratio calculator 46 shown in FIG. 10, instead of the blend ratio calculator 26 shown in FIG. 3.

The blend ratio calculator 46 includes a noise matching degree setting section 47. The blend ratio calculator 46 is configured in the same manner as the blend ratio calculator 26 according to the first embodiment except that the blend ratio calculator 46 includes a motion compensation reliability setting unit 48 and a blend ratio setting section 49, instead of the motion compensation reliability setting unit 31 and the blend ratio setting section 32, in association of the provision of the noise matching degree setting section 47.

In the blend ratio calculator 46, the noise matching degree setting section 47 determines the value of the motion compensation average residual MC D on the basis of the noise-level measurement result NL to calculate a noise matching degree NMR. The noise matching degree NMR is an evaluation value indicating how well the motion compensation average residual MC D reflects the motion in the input video signal S1. If a noise level is high, the value of the motion compensation average residual MC D is greatly affected by the noise level, meaning that the motion in the input video signal S1 is not correctly reflected in the motion compensation average residual MC D.

Accordingly, the noise matching degree setting section 47 sets first and second determination reference values NLth1 and NLth2, which have different values, so as to increase the value of the motion compensation average residual MC D with the increasing noise level on the basis of the noise-level measurement result NL. Specifically, the noise matching degree setting section 47 multiplies the noise-level measurement result NL by predetermined constants m1 and m2, for example, which are not more than one and are not less than zero, to set the determination reference values NLth1 (NL×m1) and NLth2 (NL×m2), where m1<m2.

Figure 11:
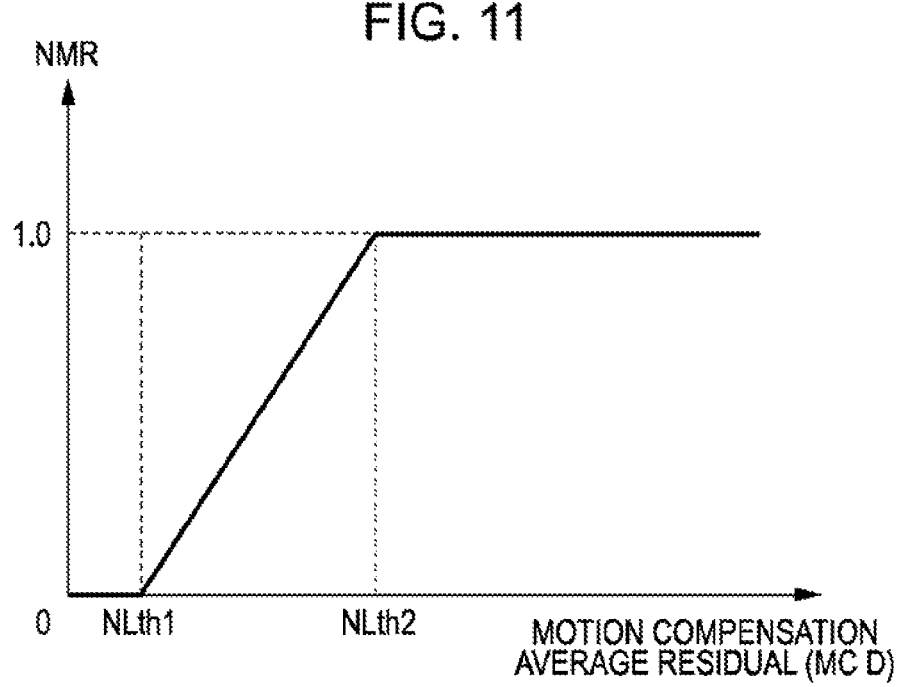
FIG. 11 is a graph showing an example of a characteristic curve to describe the operation of a noise matching degree setting section in the blend ratio calculator shown in FIG. 10.

As shown in FIG. 11, the motion compensation average residual MC D is compared with the two determination reference values NLth1 and NLth2. If the motion compensation average residual MC D is not larger than the determination reference value NLth1, the noise matching degree NMR is set to zero. If the motion compensation average residual MC D is not smaller than the determination reference value NLth2, the noise matching degree NMR is set to one. If the motion compensation average residual MC D is larger than the determination reference value NLth1 and is smaller than the determination reference value NLth2, the noise matching degree NMR is calculated by the linear interpolation using the motion compensation average residual MC D as a parameter.

The motion compensation reliability setting unit 48 calculates the intermediate value MCR of the blend ratio by using the motion compensation efficiency MCE, like the motion compensation reliability setting unit 31 according to the first embodiment. The motion compensation reliability setting unit 48 multiplies the intermediate value MCR of the blend ratio by the noise matching degree NMR to compensate the calculated intermediate value MCR with the noise matching degree NMR and outputs the compensation result as the reliability MCR.

Figure 12:
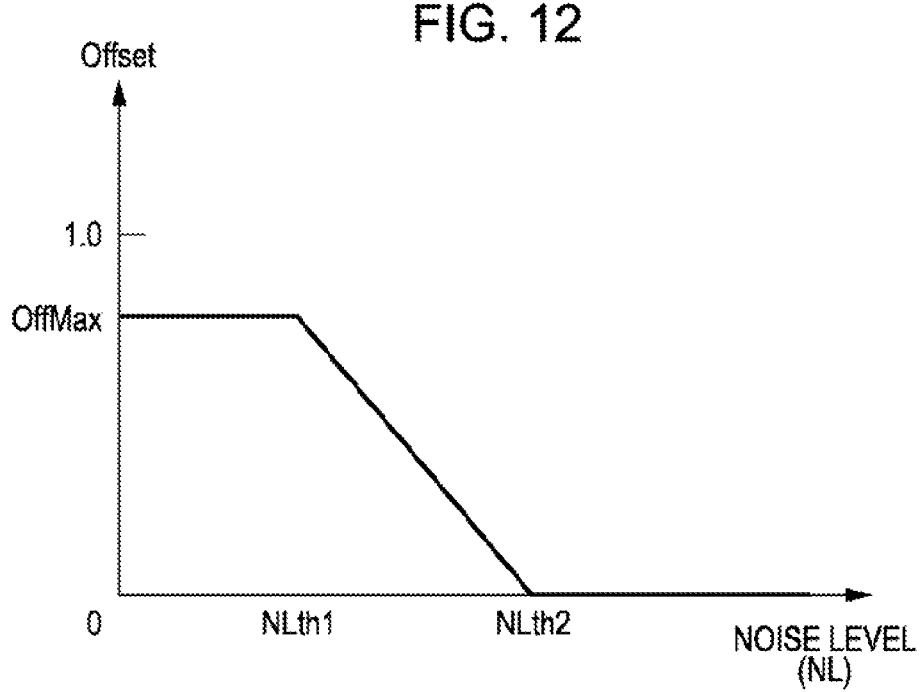
FIG. 12 is a graph showing an example of a characteristic curve to describe the operation of a blend ratio setting section in the blend ratio calculator shown in FIG. 10.

The blend ratio setting section 49 compensates the reliability MCR output from the motion compensation reliability setting unit 48 with the noise level to calculate the blend ratio MCBR. As shown in FIG. 12, the blend ratio setting section 49 determines the noise-level measurement result NL with respect to the first and second determination reference values NLth1 and NLth2 to calculate an offset value Offset used for compensating the reliability MCR. The first and second determination reference values NLth1 and NLth2 may be equal to the determination reference values NLth1 and NLth2 in the noise matching degree setting section 47 or may be different from those in the noise matching degree setting section 47.

If the noise-level measurement result NL is not higher than the first determination reference value NLth1, the blend ratio setting section 49 sets the offset value Offset to a maximum value OffMax, which is not larger than one. The maximum value OffMax is, for example, a value set by a user. If the noise-level measurement result NL is not lower than the second determination reference value NLth2, the blend ratio setting section 49 sets the offset value Offset to zero. If the noise-level measurement result NL is higher than the first determination reference value NLth1 and is lower than the second determination reference value NLth2, the blend ratio setting section 49 sets the offset value Offset by the linear interpolation using the noise-level measurement result NL as a parameter.

The blend ratio setting section 49 uses the offset value Offset to perform calculation MCBR=Offset+(1−Offset)× MCR in order to calculate the blend ratio MCBR.

According to the second embodiment of the present invention, since the noise level is measured and the blend ratio is compensated in accordance with the noise-level measurement result NL, it is possible to more appropriately mix the non-motion-compensated reference video signal with the motion-compensated reference video signal to generate the reference video signal. Accordingly, the reference video signal can be more appropriately generated to sufficiently reduce the noise level even if the noise level is varied.

Third Embodiment

Figure 13:
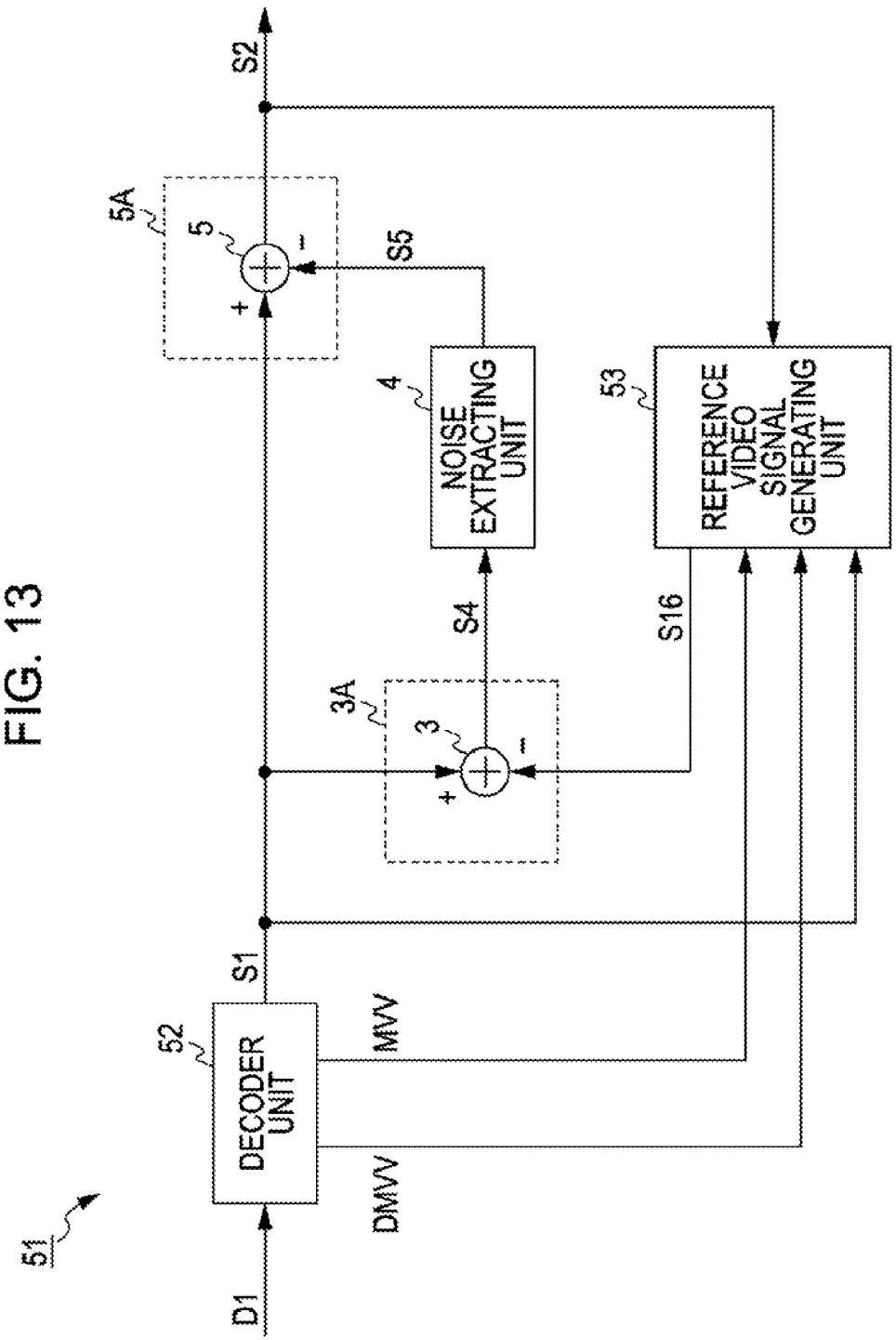
FIG. 13 is a block diagram showing an example of the configuration of a noise filter according to a third embodiment of the present invention.

FIG. 13 is a block diagram showing an example of the configuration of a noise filter 51 according to a third embodiment of the present invention. The same reference numerals are used in the noise filter 51 to identify the same components in the noise filters 21 and 41 according to the first and second embodiments. A description of such components is omitted herein. In the noise filter 51, a decoder unit 52 decodes encoded data D1 encoded by using a motion vector to generate the input video signal S1. A reference video signal generating unit 53 uses a motion vector MVV detected by the decoder unit 52 and attribute information DMVV concerning the motion vector MVV to generate the motion-compensated reference video signal and uses the motion-compensated reference video signal to generate the reference video signal S16.

The encoded data D1 is encoded according to, for example, Moving Picture Experts Group phase 2 (MPEG2) or Moving Picture Experts Group phase 4 (MPEG4). The decoder unit 52 decodes the encoded data D1 that is sequentially input to output the video signal S1. The decoder unit 52 also outputs the detected motion vector MVV, along with the attribute information DMVV concerning the motion vector MVV. The attribute information DMVV is, for example, information used for identifying a reference frame on which the calculation of the motion vector MVV is based or information used for identifying an image processing unit (macro block) used in the detection of the motion vector MVV.

Figure 14:
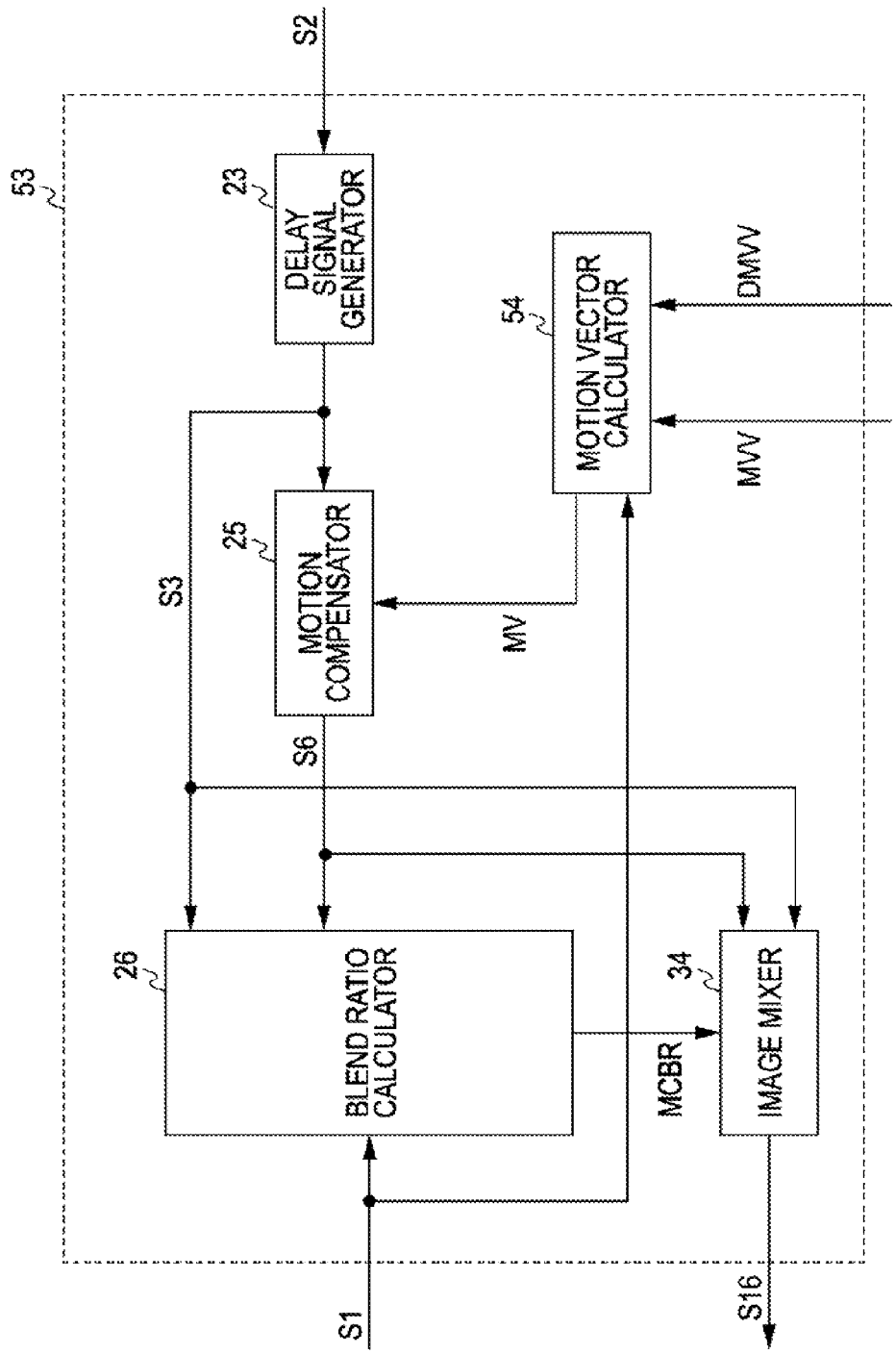
FIG. 14 is a block diagram showing an example of the configuration of a reference video signal generating unit in the noise filter shown in FIG. 13.

FIG. 14 is a block diagram showing an example of the configuration of the reference video signal generating unit 53 shown in FIG. 13. The reference video signal generating unit 53 is configured in the same manner as the reference video signal generating unit 22 in FIG. 1 according to the first embodiment except that the reference video signal generating unit 53 includes a motion vector calculator 54, instead of the motion vector detector 24.

The motion vector calculator 54 calculates a motion vector MV used in the motion compensation from the motion vector MVV and the attribute information DMVV concerning the motion vector MVV, which have been used in the encoding and which are output from the decoder unit 52.

Figure 15:
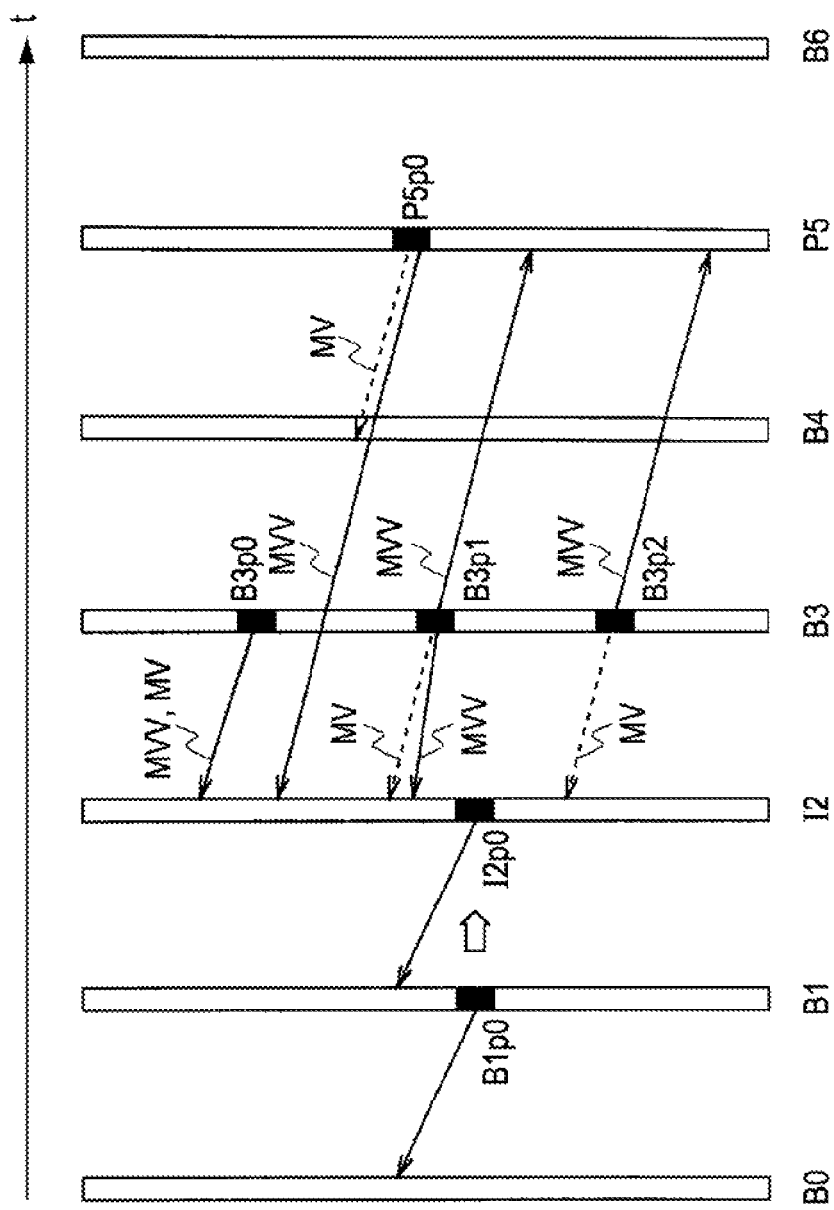
FIG. 15 is a graph showing an example of a characteristic curve to describe the operation of a motion vector calculator in the reference video signal generating unit shown in FIG. 14.

As shown in FIG. 15, when a frame for which the motion vector MV is calculated is encoded in a Predictive-coded picture (P picture) (denoted by "P5"), the decoder unit 52 detects the motion vector MVV by backward prediction using the backward adjacent Intra-coded picture (I picture) or the backward adjacent P picture as a prediction frame. In this case, the motion vector calculator 54 corrects the motion vector MVV by the backward prediction to the motion vector with respect to the backward adjacent frame in this P picture frame to calculate the motion vector MV used in the motion compensation. Specifically, the motion vector calculator 54 divides the motion vector MVV by the number of frames between the "P5" picture and the prediction frame to calculate the motion vector MV with respect to the backward adjacent frame.

When a frame for which the motion vector MV is calculated is encoded in a Bidirectionally predictive-coded picture (B picture) (denoted by "B3"), the B3 picture is encoded by the backward prediction, bidirectional prediction, or forward prediction. If the B3 picture is encoded by the backward prediction, the motion vector MV used in the motion compensation is calculated in the same manner as in the P picture. Accordingly, in a macro block B3$p0$ in the example shown in FIG. 15, the motion vector MVV using the backward adjacent picture as the prediction frame is used as the motion vector MV in the motion compensation.

If the B3 picture is encoded by the forward prediction, the direction of the motion vector MVV detected by the decoder unit 52 is inverted and, then, the motion vector MV used in the motion compensation is calculated in the same manner as in the P picture. In a macro block B3$p2$ in the example shown in FIG. 15, the direction of the motion vector MVV using the forward adjacent P picture as the prediction frame is inverted and the motion vector MVV is divided by the number of frames between the "B3" picture and the prediction frame to calculate the motion vector MV used in the motion compensation.

If the B3 picture is encoded by the bidirectional prediction, two motion vectors MVV are detected by using the backward adjacent I picture and the forward adjacent P picture, the backward adjacent P picture and the forward adjacent I picture, or the backward and forward adjacent P pictures as the prediction frames. In this case, the motion vector calculator 54 processes the motion vector MVV using the forward adjacent P picture or I picture as the prediction frame in the same manner as in the forward prediction to calculate one motion vector. The motion vector calculator 54 also processes the motion vector MVV using the backward adjacent P picture or I picture as the prediction frame in the same manner as in the backward prediction to calculate one motion vector. The motion vector calculator 54 calculates an average of the two motion vectors calculated in the above manner to use the calculated average as the motion vector MV used in the motion compensation. If a practically sufficient accuracy can be ensured, only the motion vector MVV using the backward adjacent P picture or I picture as the prediction frame or only the motion vector MVV using the forward adjacent P picture or I picture as the prediction frame may be used to calculate the motion vector MVV used in the motion compensation.

When a frame for which the motion vector MV is calculated is encoded in an I picture, the motion vector MV detected in the corresponding macro block in the backward adjacent frame is set. Accordingly, in a macro block I2p0 in the I picture in the example shown in FIG. 15, the motion vector used in the motion compensation is set in a macro block B1P0 at the same position in the backward adjacent B picture.

According to the third embodiment of the present invention, since the motion vector detected in the decoding is used to generate the motion-compensated reference video signal, the noise level in the input video signal can be reduced with a simpler configuration, compared with that in the first embodiment. Particularly, the noise level can be sufficiently reduced in the noise filter according to the third embodiment of the present invention even if the motion vector has a lower accuracy. Accordingly, it is possible to sufficiently reduce the noise level by using the motion vector detected by the decoder unit to perform the motion compensation.

Fourth Embodiment

Although the noise filter is embodied by hardware configuration in the above embodiments of the present invention, the present invention is not limited to the hardware configuration. The noise filter may be embodied by execution of programs by an arithmetic processing unit. In this case, the programs may be installed in advance or may be recorded in a recording medium, such as an optical disc, a magnetic disk, or a memory card, to deliver the recording medium. Alternatively, the programs may be downloaded over a network, such as the Internet.

Figure 19:
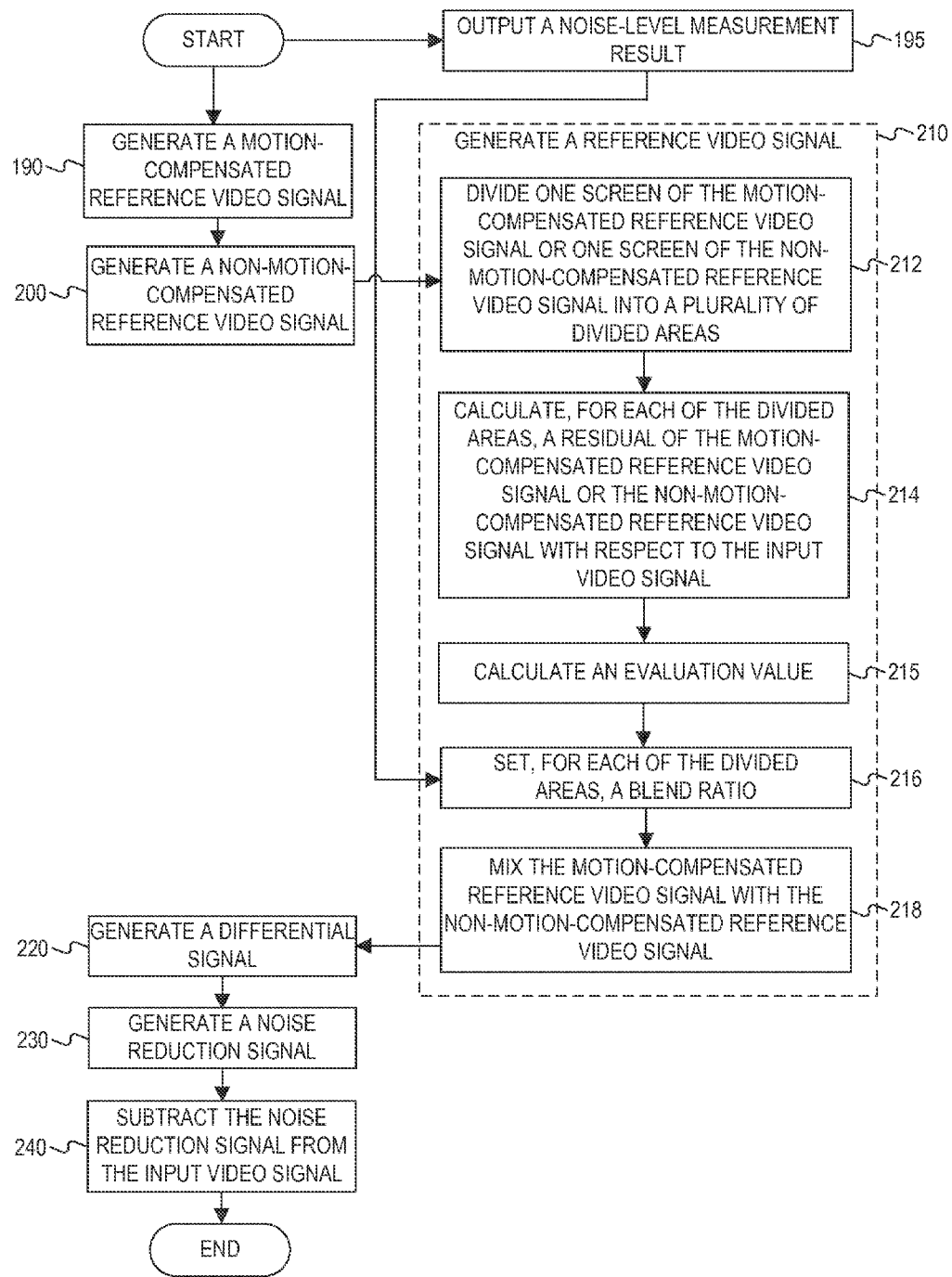
FIG. 19 is a flow chart showing a noise reduction method.

In an exemplary configuration, execution of the programs causes performance of a noise reduction method for reducing noise in an input video signal to output an output video signal. As illustrated in FIG. 19, the method includes generating a motion-compensated reference video signal from the output video signal (step 190) and measuring a noise level of the input video signal to output a noise-level measurement result (step 195). The method also includes delaying the output video signal to generate a non-motion-compensated reference video signal (step 200). In addition, the method includes mixing the motion-compensated reference video signal with the non-motion-compensated reference video signal to generate a reference video signal (step 210).

Generating the reference video signal includes dividing one screen of the motion-compensated reference video signal or one screen of the non-motion-compensated reference video signal into a plurality of divided areas, at least two of the divided areas partially overlapping each other in an overlapped area (step 212). Generating the reference video signal also includes calculating, for each of the divided areas, a residual of the motion-compensated reference video signal or the non-motion-compensated reference video signal with respect to the input video signal (step 214). Additionally, generating the reference video signal includes integrating the residual of the motion-compensated reference video signal with the residual of the non-motion-compensated reference video signal to calculate an evaluation value on the basis of the residual of the motion-compensated reference video signal or the residual of the non-motion-compensated reference video signal (step 215). In addition, generating the reference video signal includes setting, for each of the divided areas, a blend ratio by which the motion-compensated reference video signal is mixed with the non-motion-compensated reference video signal in accordance with at least one of the calculated residuals, the evaluation value, and/or the noise-level measurement result (step 216). Generating the reference video signal also includes performing, based on at least two of the blend ratios, weighted addition to the motion-compensated reference video signal and the non-motion-compensated reference video signal to mix, in the overlapped area, the motion-compensated reference video signal with the non-motion-compensated reference video signal (step 218).

As shown in FIG. 19, the method also includes subtracting the generated reference video signal from the input video signal to generate a differential signal (step 220). Additionally, the method includes compensating the differential signal to generate a noise reduction signal (step 230). The method also includes subtracting the noise reduction signal from the input video signal (step 240).

It should be understood by those skilled in the art that various modifications, combinations, sub-combinations and alterations may occur depending on design requirements and other factors insofar as they are within the scope of the appended claims or the equivalents thereof.

What is claimed is:

1. A noise reduction method for reducing noise in an input video signal to output an output video signal, the method comprising the steps of:

generating a motion-compensated reference video signal from the output video signal;

delaying the output video signal to generate a non-motion-compensated reference video signal;

mixing the motion-compensated reference video signal with the non-motion-compensated reference video signal to generate a reference video signal;

subtracting the generated reference video signal from the input video signal to generate a differential signal;

compensating the differential signal to generate a noise reduction signal; and subtracting the noise reduction signal from the input video signal, wherein the step of generating the reference video signal includes the steps of dividing one screen of the motion-compensated reference video signal or one screen of the non-motion-compensated reference video signal into a plurality of divided areas, at least two of the divided areas partially overlapping each other in an overlapped area;

calculating, for each of the divided areas, a residual of the motion-compensated reference video signal or the non-motion-compensated reference video signal with respect to the input video signal;

setting, for each of the divided areas, a blend ratio by which the motion-compensated reference video signal is mixed with the non-motion-compensated reference video signal in accordance with at least one of the calculated residuals; and performing, based on at least two of the blend ratios, weighted addition to the motion-compensated reference video signal and the non-motion-compensated reference video signal to mix, in the overlapped area, the motion-compensated reference video signal with the non-motion-compensated reference video signal.

2. The noise reduction method according to claim 1, wherein the step of generating the reference video signal includes the steps of integrating the residual of the motion-compensated reference video signal with the residual of the non-motion-compensated reference video signal to calculate an evaluation value on the basis of the residual of the motion-compensated reference video signal or the residual of the non-motion-compensated reference video signal, and setting the blend ratio by which the motion-compensated reference video signal is mixed with the non-motion-compensated reference video signal in accordance with the calculated evaluation value.

3. The noise reduction method according to claim 2, wherein, in the step of generating the reference video signal, the blend ratio is set for every divided area set for the motion-compensated reference video signal and the non-motion-compensated reference video signal.

4. The noise reduction method according to claim 2, further comprising the step of measuring a noise level of the input video signal to output a noise-level measurement result, wherein, in the step of setting the blend ratio, the blend ratio is compensated in accordance with the noise-level measurement result.

5. The noise reduction method according to claim 1, wherein, in the step of generating the reference video signal, the blend ratio is set for every divided area set for the motion-compensated reference video signal and the non-motion-compensated reference video signal.

6. The noise reduction method according to claim 1, further comprising the step of measuring a noise level of the input video signal to output a noise-level measurement result, wherein, in the step of setting the blend ratio, the blend ratio is compensated in accordance with the noise-level measurement result.

7. The noise reduction method according to claim 1, wherein the input video signal is generated by a decoder unit that decodes encoded data resulting from encoding with a motion vector, and wherein, in the step of generating the motion-compensated reference video signal, motion compensation is performed to the input video signal by using the motion vector acquired by the decoder unit to generate the motion-compensated reference video signal.

8. A recording medium having a noise reduction program recorded thereon for reducing noise in an input video signal to output an output video signal, the program comprising the steps of:

generating a motion-compensated reference video signal from the output video signal;

delaying the output video signal to generate a non-motion-compensated reference video signal;

mixing the motion-compensated reference video signal with the non-motion-compensated reference video signal to generate a reference video signal;

subtracting the generated reference video signal from the input video signal to generate a differential signal;

compensating the differential signal to generate a noise reduction signal; and subtracting the noise reduction signal from the input video signal, wherein the step of generating the reference video signal includes the steps of dividing one screen of the motion-compensated reference video signal or one screen of the non-motion-compensated reference video signal into a plurality of divided areas, at least two of the divided areas partially overlapping each other in an overlapped area;

calculating, for each of the divided areas, a residual of the motion-compensated reference video signal or the non-motion-compensated reference video signal with respect to the input video signal;

setting, for each of the divided areas, a blend ratio by which the motion-compensated reference video signal is mixed with the non-motion-compensated reference video signal in accordance with at least one of the calculated residuals; and performing, based on at least two of the blend ratios, weighted addition to the motion-compensated reference video signal and the non-motion-compensated reference video signal to mix, in the overlapped area, the motion-compensated reference video signal with the non-motion-compensated reference video signal.

9. A noise reduction apparatus for reducing noise in an input video signal to output an output video signal, the apparatus comprising:

a motion compensation unit that generates a motion-compensated reference video signal from the output video signal;

a delay unit that delays the output video signal to generate a non-motion-compensated reference video signal;

a reference video signal generating unit that:

mixes the motion-compensated reference video signal with the non-motion-compensated reference video signal to generate a reference video signal;

divides one screen of the motion-compensated reference video signal or one screen of the non-motion-compensated reference video signal into a plurality of divided areas, at least two of the divided areas partially overlapping each other in an overlapped area;

calculates, for each of the divided areas, a residual of the motion-compensated reference video signal or the non-motion-compensated reference video signal with respect to the input video signal;

sets, for each of the divided areas, a blend ratio by which the motion-compensated reference video signal is mixed with the non-motion-compensated reference video signal in accordance with at least one of the calculated residuals; and performs, based on at least two of the blend ratios, weighted addition to the motion-compensated reference video signal and the non-motion-compensated reference video signal to mix, in the overlapped area, the motion-compensated reference video signal with the non-motion-compensated reference video signal;

a differential signal generating unit that subtracts the generated reference video signal from the input video signal to generate a differential signal;

a noise reduction signal generating unit that compensates the differential signal to generate a noise reduction signal; and a signal subtraction unit that subtracts the noise reduction signal from the input video signal.

* * * * *